May 22, 1928.  
C. G. STRANDLUND  
TWO-ROW CULTIVATOR  
Filed Jan. 2, 1926  
1,670,912  
3 Sheets-Sheet 3
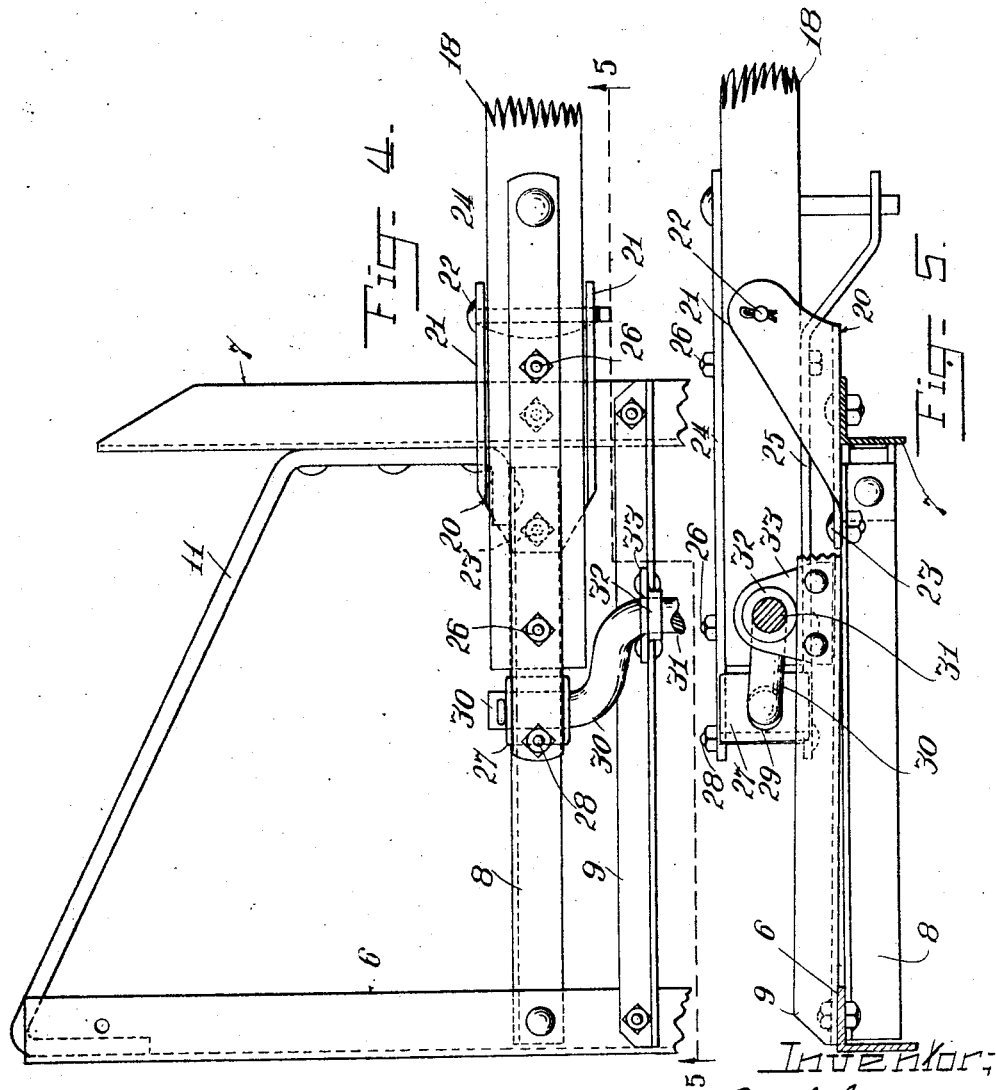

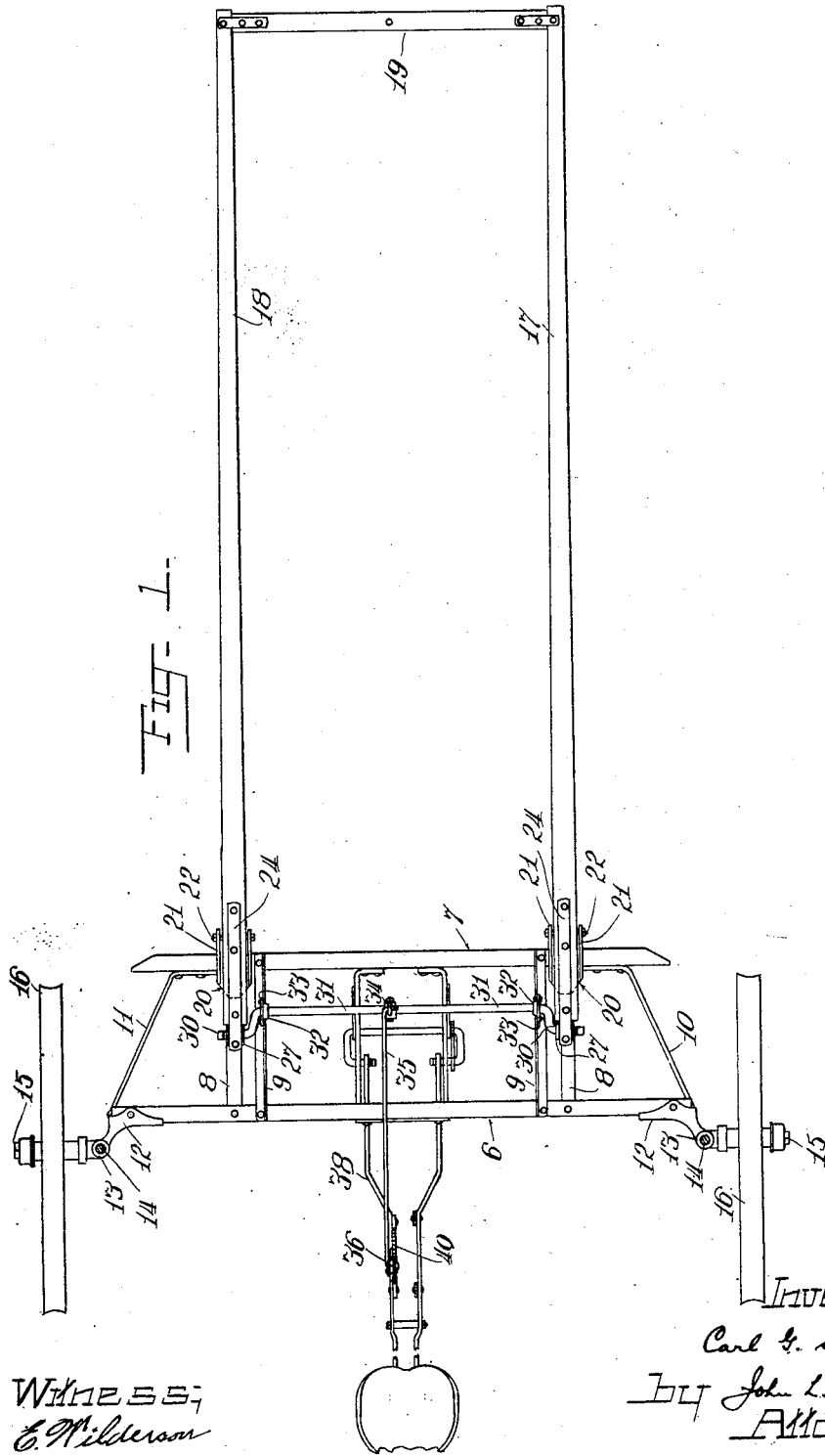

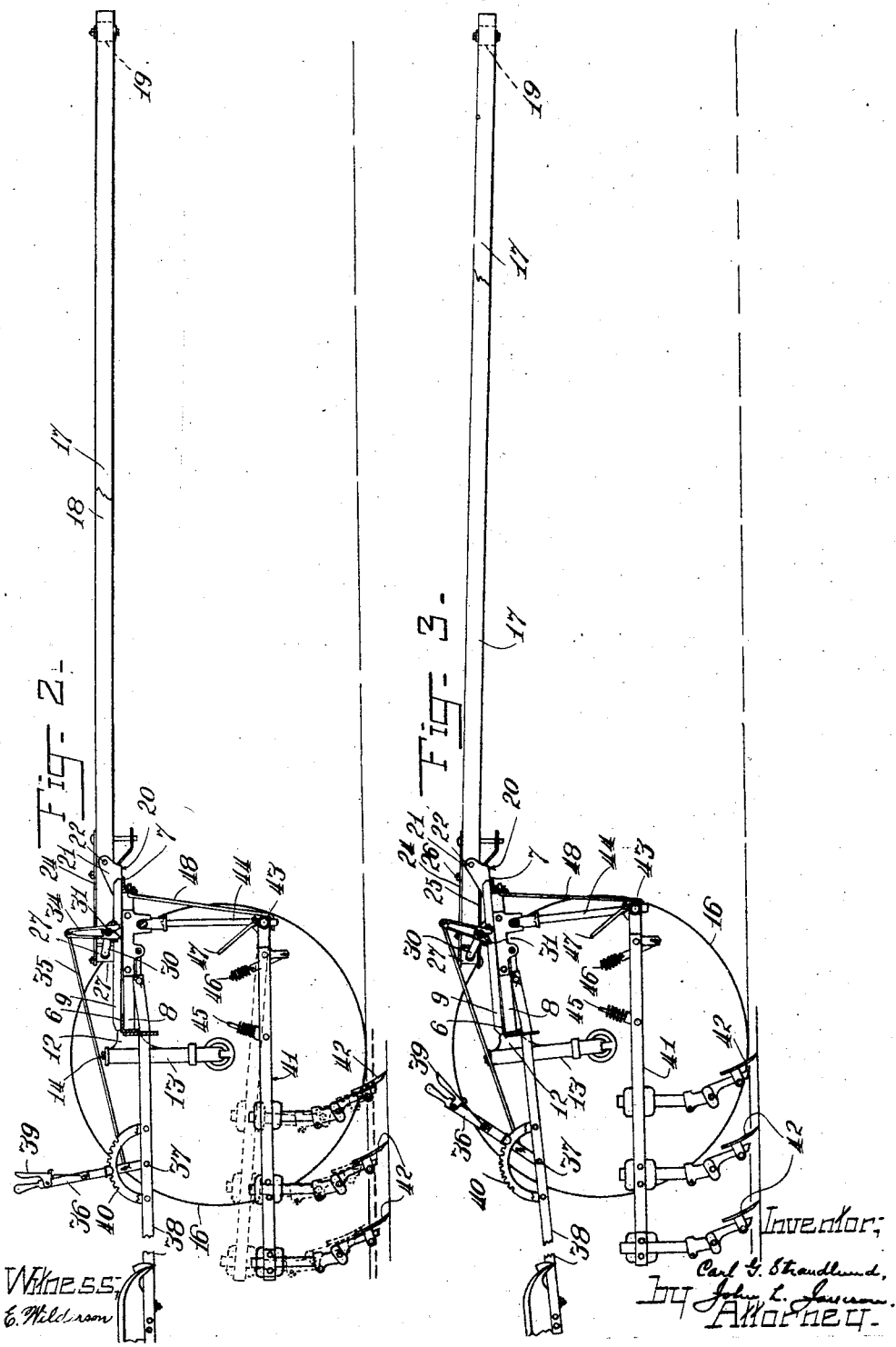

Patented May 22, 1928.

1,670,912

UNITED STATES PATENT OFFICE.

CARL G. STRANDLUND, OF MOLINE, ILLINOIS, ASSIGNOR TO DEERE & COMPANY, OF MOLINE, ILLINOIS, A CORPORATION OF ILLINOIS.

TWO-ROW CULTIVATOR.

Application filed January 2, 1926. Serial No. 78,860.

My invention relates to cultivators of the type in which the rear end of the tongue is pivotally connected with the front portion of the cultivator frame by a transverse horizontal pivot so that the frame may be tilted with reference to a horizontal plane to control the position of the shovels with respect to the ground. It is quite common in the art of single row cultivators, in which the rigs are connected with the frame in such a manner that they are somewhat positively maintained in position with respect thereto, to support the tongue on the frame on a transverse horizontal axis, and to provide lever controlled means for raising or lowering the pivotal connection between the tongue and the frame to adapt the cultivator to teams of different size, and to level the shovels by tilting the frame with respect to the tongue when the rigs are lifted slightly for shallow cultivation, so that they will operate at a uniform depth. Obviously if the frame could not be tilted relatively to the tongue, the shovels carried by the cultivator rigs would not all operate at the same depth when the rigs were adjusted vertically to vary the depth of cultivation, or when the cultivator was used with horses either larger or smaller than the average size, since as the front ends of the rigs are pivotally connected with the lowermost part of the cultivator arch and the rearmost shovels are farthest from the pivotal points of the rigs, such shovels swing through a wider arc than the front shovels when the rigs are adjusted vertically either by rocking the frame about the axes of the supporting wheels, as would be the case if horses of a different size were used on a rigid tongue cultivator, or by manual adjustment of the rigs to vary the depth of cultivation. By pivotally connecting the tongue with the frame, however, this difference in vertical movement of the front and rear shovels can be compensated for by tilting the frame with respect to the tongue to a sufficient extent to bring the shovels to the same level. While as above indicated such compensation has been provided for in single row cultivators, so far as I am aware no one has heretofore provided a practicable two-row cultivator capable of being adjusted in that manner. In cultivators of the latter type two tongues are required, which are connected with the frame and are positioned directly above the plant rows to be cultivated. If three horses are employed, one horse is located between the tongues and one is placed outside of each tongue. If four horses are employed, the space between the tongues is left vacant, and evener equipment is used so that an additional horse may be placed alongside of each of the two outside horses. With such an arrangement it is of course necessary that the two tongues be connected with the frame at points far enough apart to permit of the placing of a horse between them.

The object of my invention is to provide a two-row cultivator having the two tongues arranged as above described and pivotally connected with the frame so that the frame may be tilted with respect to the tongues, or longitudinally with reference to a horizontal plane, in connection with means controlled by the operation of a single lever to simultaneously and similarly adjust the frame with respect to both tongues, so that uniform adjustment of both ends of the frame and the rigs connected therewith will always be effected, and consequently the frame and tongues will not be warped, and the shovels will operate at a uniform depth. This object I accomplish as illustrated in the drawings and as hereinafter described. What I regard as new is set forth in the claims.

In the accompanying drawings,—

Fig. 1 is a diagrammatic plan view illustrating the frame and the dual tongue arrangement, together with such parts of a cultivator as are necessary to an understanding of my invention;

Fig. 2 is substantially a central longitudinal vertical section showing in full lines the rigs working at a uniform depth, and indicating by dotted lines the position the rigs would assume if the rigs were adjusted for shallow cultivation without tilting the frame to level them;

Fig. 3 is a view similar to Fig. 2, but illustrating the frame tilted to level the rigs for shallow cultivation;

Fig. 4 is an enlarged detail showing in plan the rear portion of one of the tongues and the way in which it is pivotally mounted on the frame, together with some of the connections by the operation of which the frame is tilted with respect to the tongues; and Fig. 5 is a longitudinal vertical section on line 5—5 of Fig. 4.

Referring to the drawings,—6, 7 indicate transverse bars, preferably of angle iron, which constitute part of the frame of the cultivator, said bars being fixedly connected together by fore-and-aft extending bars 8, 9, and by diagonal end braces 10, 11, as best shown in Fig. 1. The frame bar 6 is provided at its ends with brackets 12 having vertical sleeves 13 in which are journaled upright shafts 14 which at their lower ends carry wheel spindles 15 on which are mounted the usual supporting wheels 16. The wheels are preferably arranged to be angled, for guiding the cultivator, in any suitable way known in the art.

Connected at their rear ends with the cultivator frame are two tongues 17, 18 which are spaced apart far enough to receive a horse between them, the front ends of the tongues being connected together by a tie member 19 to the middle of which is usually connected a neck yoke adapted to be secured to the harness of the horses. The manner in which the rear ends of the tongues are connected with the frame is best shown in Figs. 4 and 5, from an inspection of which it will be seen that the front cross-bar 7 of the frame is provided with two brackets 20 located at the proper points to receive the tongues, each of which brackets comprises upwardly extending members 21 spaced far enough apart so that the tongue fits between them. In the members 21 of each of the brackets is mounted a transverse pivot bolt 22 which extends transversely through the tongue and forms a horizontal pivot therefor so that the frame may tilt about a transverse axis relatively to the two tongues. Preferably the brackets 20 are not only secured to the cross-bar 7 of the frame, but also are extended rearwardly and are connected with the longitudinal bars 8 by bolts or rivets 23, as best shown in Fig. 5. It will be noted that the side members 21 of each of the brackets 20 project upward along the opposite sides of the tongue connected with such bracket, so that the steering force of the draft animals applied to the tongue is transmitted through a substantial structure to the frame.

As also shown in Figs. 4 and 5, the upper and lower faces of each tongue are provided at the rear with plates 24, 25 connected thereto by bolts 26, which plates extend rearwardly beyond the rear end of the tongue to which they are attached, and form supports for a bearing block 27 which is clamped securely between them, as by a bolt 28. The bearing blocks 27 are bored transversely, as shown at 29 in Fig. 5, to receive the crank end portions 30 of a double crank rock shaft 31, the straight intermediate portion of which is mounted in bearings 32 formed in brackets 33 secured to the longitudinal bars 9. By this construction it will be apparent that by rocking the rock shaft 31 the crank end portions 30 thereof will thrust upward or downward against the rear ends of the tongue, thereby tilting the frame with respect to the tongue about the pivots 22. Preferably the passages 29 in the bearing blocks 27 are elongated slightly to prevent binding when the rock shaft is rocked.

For rocking the rock shaft 31 it is provided with an upwardly extending arm 34 fixedly secured thereto, preferably about midway of its length, with the upper end portion of which arm is connected the front end of a connecting rod 35 which at its rear end is connected with a lever 36 pivoted at 37 upon a seat supporting frame 38 secured to the frame in any suitable way and projecting rearwardly therefrom. The lever 36 is provided with the usual latch mechanism controlled by hand lever 39 and arranged to engage a notched sector 40 secured on the seat support, so that the lever 36 may be secured in any position to which it may be adjusted. From the foregoing description it will be seen that by operating the lever 36 the rock shaft 31 may be rocked to tilt the frame with respect to the tongues to any desired angular position within the range of adjustment provided for. Figs. 2 and 3 show two of the positions to which the parts may be adjusted.

The cultivator is, of course, provided with the usual rigs 41 to which are connected the cultivator shovels 42, the front ends of the rigs being pivotally connected, as shown at 43 in Figs. 2 and 3, to the lower ends of the usual arches 44 which are connected with the frame in any approved way. Also the rigs are arranged to be swung upward or downward about the pivotal points 43, as indicated by the dotted lines in Fig. 2. The devices for connecting the rigs with the frame and for raising and lowering the rigs have not been fully illustrated or described because it is believed to be unnecessary to do so, as such devices are well known in the art. I prefer to use for that purpose the construction shown in the patent to Holstein, No. 1,346,317, dated July 13, 1920, and in Figs. 2 and 3 have shown parts 45, 46, 47, and 48 which correspond with elements of the rig supporting and lifting devices shown in said patent.

By the construction described I provide for tilting the frame with respect to the tongues by the operation of a single lever and in such manner that the frame is adjusted with respect to both tongues in precisely the same way and to the same extent, so that both rigs are simultaneously adjusted to the same extent, and consequently all the shovels of all the rigs operate at a uniform depth, thereby eliminating the danger of warping the frame or the tongues. In addition to providing for such uniform adjustment the rock shaft serves the further purpose of transmitting to both tongues uniformly any strains upon the frame that tend to warp it, incident to the engagement of the shovels at one side of the machine with hard ground, or with a root or other obstruction. By reason of the connection of the tongues with the neck yoke supported by the horses such twisting strains are overcome and the shovels are held in their proper position in the soil.

What I claim as my invention and desire to secure by Letters Patent, is—

1. In a multiple row cultivator having a relatively wide, transversely extending, wheel-supported frame, and cultivator rigs connected therewith, of a plurality of tongues spaced relatively widely apart and having separate pivotal connection with said frame adjacent to their rear ends to permit tilting of the frame with respect to said tongues, a plurality of bearings on said frame, each of said bearings positioned adjacent a tongue, a transversely extending rock shaft mounted in said bearings and having a plurality of crank portions, each connected with a tongue, whereby, by rocking said rock shaft, the frame may be tilted simultaneously and similarly with respect to said tongues, and means operable to rock said rock shaft.

2. In a two-row cultivator, the combination with a wheel supported frame, and cultivator rigs connected therewith, of two tongues having separate pivotal connections with said frame adjacent to their rear ends to permit tilting of the frame with respect to said tongues, a transverse rock shaft pivotally mounted on the frame between said tongues and having crank portions pivotally connected with said tongues in rear of said pivotal connections whereby by rocking said rock shaft the frame may be tilted simultaneously and similarly with respect to both tongues, and means operable to rock said rock shaft.

3. In a two-row cultivator, the combination with a wheel supported frame, and cultivator rigs connected therewith, of two tongues having separate pivotal connections with said frame adjacent to their rear ends to permit tilting of the frame with respect to said tongues, a transverse rock shaft mounted in bearings on the frame between said tongues and having crank portions at the opposite end portions thereof, bearing blocks secured to said tongues in rear of said pivotal connections and forming bearings for the crank portions of the rock shaft, and means operable to rock said rock shaft.

4. In a two-row cultivator, the combination with a wheel supported frame, and cultivator rigs connected therewith, of two tongues having their rear ends separately extended over the front portion of said frame, separate means pivotally connecting said tongues adjacent to their rear ends with said frame to permit tilting of the frame with respect to said tongues, a transverse rock shaft mounted on the frame between said tongues and having crank portions at the opposite end portions thereof, upper and lower plates connected with and extending rearwardly from the rear portions of said tongues, bearing blocks mounted between said plates and having openings for the reception of the crank portions of said rock shaft, and means operable to rock said rock shaft.

5. In a two-row cultivator, the combination with a wheel supported frame, and cultivator rigs connected therewith, of brackets secured to said frame, each of said brackets having vertically disposed side members spaced apart, tongues having their rear end portions fitted between the side members of said brackets, transverse horizontal pivots connecting said tongues with said brackets, and means mounted on the frame and connected with the rear end portions of the tongues and operable to simultaneously and similarly tilt the frame with respect to both tongues.

6. In a two-row cultivator, the combination with a wheel supported frame, and cultivator rigs connected therewith, of brackets secured to said frame, each of said brackets having vertically disposed side members spaced apart, tongues having their rear end portions fitted between the side members of said brackets, transverse horizontal pivots connecting said tongues with said brackets, a transversely disposed rock shaft mounted on the frame and having crank portions at the end portions thereof, bearings at the rear ends of said tongues for the crank portions of said rock shaft, and means operable to rock said rock shaft.

7. In a two-row cultivator, the combination with a wheel supported frame, and cultivator rigs connected therewith, of two tongues having separate pivotal connections with said frame adjacent to their rear ends to permit tilting of the frame with respect to said tongues, a rock shaft mounted on the frame between said tongues and having crank portions connected with said tongues at one side of their pivotal connections whereby by rocking said rock shaft the frame may be tilted simultaneously and similarly with respect to both tongues, an arm fixedly connected with said rock shaft between said tongues, and a lever mounted on the frame and connected with said arm for rocking said rock shaft.

CARL G. STRANDLUND.